Oct. 7, 1941.                J. J. MAURO                2,258,024
                    AUTOMATIC STATION TUNING APPARATUS
                         Filed Oct. 17, 1940            6 Sheets-Sheet 1

INVENTOR.
JOHN J. MAURO.
BY J.T. Motherhead
ATTORNEY.

Oct. 7, 1941.                J. J. MAURO                2,258,024
                    AUTOMATIC STATION TUNING APPARATUS
                       Filed Oct. 17, 1940         6 Sheets—Sheet 4

INVENTOR.
JOHN J. MAURO.
BY J. Mothershead
    attorney

Oct. 7, 1941.                J. J. MAURO                2,258,024
                    AUTOMATIC STATION TUNING APPARATUS
                       Filed Oct. 17, 1940        6 Sheets-Sheet 6

INVENTOR.
JOHN J. MAURO
BY
ATTORNEYS.

Patented Oct. 7, 1941

2,258,024

UNITED STATES PATENT OFFICE 2,258,024

AUTOMATIC STATION TUNING APPARATUS

John J. Mauro, Brooklyn, N. Y.

Application October 17, 1940, Serial No. 361,550

12 Claims. (Cl. 250—40)

(Granted under the act of March 3, 1883, as amended April 30, 1928; 370 O. G. 757)

This invention relates to the art of producing and controlling successive operations of variable magnitude at predetermined intervals over a period of time, as for example, to controlling a radio receiving set for tuning in only selected stations at some or all of the broadcasting periods for an entire day or for any portion or portions thereof.

Important objects of the invention are to provide for greater convenience of the user of apparatus of the class described by making it possible to select, by setting or adjustment of the apparatus at one time, the operations desired for quite a considerable period so that the apparatus may function as intended during that period without attention from the operator or user; to provide apparatus of this general class which is particularly adapted for installation in a radio receiving set for producing and controlling the operations of adjusting the tuning means of the set for selected intervals over a given period; and also to provide apparatus of the class described having an improved construction and relative arrangement of parts.

The invention provides for using a motor for making desired adjustments or settings at selected intervals and controlling the duration of the period of operation of the motor and therefore the extent of the adjustment at each selected interval by having the motor also cause one of a plurality of previously adjusted members to traverse in engagement with a contact or segment, which controls the motor circuit, from the initial position of such member substantially to the end of such contact or segment, so that the circuit is completed and the motor operates only during such traversing engagement of the member and the contact or segment. Engagement only at selected intervals may be effected between one of the previously adjusted members and a particular contact or segment controlling the motor circuit by actuating means subject to a suitable time control for intermittently producing relative movement between the previously adjusted member or members and a particular contact or segment. Any desired adjustment once effected may be retained for the interval between the time controlled relative movement and for any multiple thereof, by previous adjustment to a neutral or "off" position of a suitable number of the contact engaging members so that the latter do not engage a controlling contact or segment and the motor therefore, does not operate to change the adjustment. This makes it possible, when using this apparatus with a radio receiving set, to retain a selected radio station, for example, for a number of intervals, such as the usual 15-minute periods of broadcasting stations.

The features of the invention are illustrated in the accompanying drawings, wherein.

The embodiment selected for illustration is adapted to be installed in a cabinet 10 (Fig. 16) of a radio receiving set having a tuning means here shown as comprising cooperating fixed and movable condenser plates 11 and 12 (Fig. 6), respectively, the latter being fixedly mounted on a rotary shaft 13 extending through the front wall of the cabinet 10 and journalled in a suitable bearing 14 mounted preferably on the inner side of this wall. The protruding end of this shaft may be equipped with suitable means, such as a knob 16, for facilitating manual adjustment of shaft 13 and the movable condenser plates 12 carried thereby. For automatically adjusting the condenser plates there is provided a motor 17, preferably of the reversible type, having its shaft 18 supported in a bearing 19 mounted on any fixed support, as upon an upstanding bracket 21 (Figs. 6, 7, 9, 11–14). Preferably, this bracket is provided with end walls 22 and 23 in which a shaft 24 is rotatably mounted. Mitre gearing 26 may be provided for transmitting rotary motion between the motor shaft and shaft 24, and similarly, mitre gearing 27 may be provided for transmitting rotary motion between shafts 24 and 13.

The extent of each automatic adjustment of the tuning means, as of the movable condenser plates 12, may be determined by limiting the period of operation of the motor for each such adjustment. This may be accomplished by providing, in the motor circuit, normally open contacts which are closed only for a sufficient time at each adjustment interval to permit the motor to make the desired adjustment. When using a reversible motor, as shown, there may be one set of these contacts in each of the circuits which controls the motor in its two directions of operation.

Preferably, these contacts are in the form of opposed pairs of cooperating, inner and outer arcuate contacts or segments 28, 29, 31 and 32 (Figs. 5, 11 and 18), respectively, arranged with the adjacent ends of the contacts of each pair spaced from opposed adjacent ends of the contacts of the other pair to leave open spaces or gaps 33 and 34 preferably 180 degrees apart. The contacts of each pair may be normally urged apart by means of a suitable number of radially disposed and circumferentially spaced expansible springs 36 mounted on similarly spaced insulated pins 37 and 38 (Fig. 18) carried, respectively by the inner and outer contacts. Preferably, each of the outer contacts 29 and 31 is formed, respectively as a part of a supporting standard 39 and 41 equipped with suitable base plates or attaching flanges 42 and 43, respectively.

A pair of circumferentially extending insulated flat plates 44 and 46 may be secured in any suitable manner to the sides of outer contact 29 so as to extend inwardly therefrom to embrace inner contact 28 and provide a guideway in which this inner contact may move radially. The outer pins 38 for the springs 36 may be mounted, as shown, to extend directly through these plates so as to secure these plates to outer contact 29. These plates may be provided with substantially radial slots 47 through which the inner pins 37 may extend to provide for substantially radial movement of this inner contact. In a like manner, circumferentially extending insulated flat plates 48 and 49 may be secured by pins 38 associated therewith to outer contact 31 to extend inwardly therefrom about inner contact 32 to provide a radial guideway therefor. These plates may be provided with substantially radial slots 47 for the inner pins 37 as described with reference to plates 44 and 46.

Figure 1:
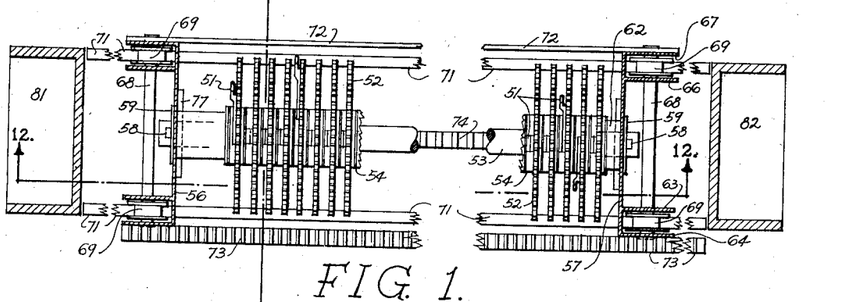
Figs. 1, 2 and 3 are plan views, with parts omitted and broken away for the purposes of illustration, of the lower portion of apparatus of my automatic station tuning device described herein.
Figures 5, 18:
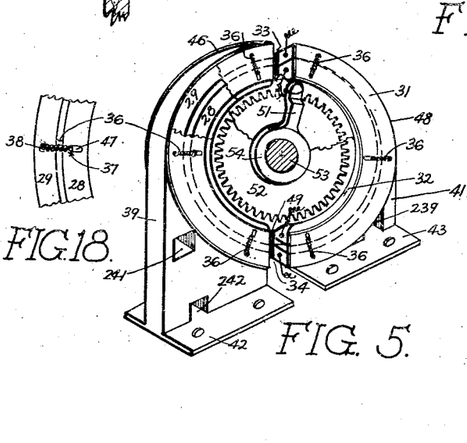
Fig. 5 is a perspective view of the pairs of segmental contacts shown in Fig. 4 with a cooperating gear and a member for effecting engagement of these contacts.
Fig. 18 is an enlarged detailed view of a portion of the structure shown in Fig. 5.

For effecting engagement of the contacts just described, there may be provided a plurality of members, preferably in the form of substantially radial arms or pendants 51 (Figs. 1, 4, 5, 11 and 12), each secured individually to one of a corresponding number of gears 52 rotatably mounted upon a fixed shaft 53, as by means of hub portions 54 which also serve as a means for spacing these gears and their attached members 51 longitudinally of shaft 53. This shaft may be mounted in movable end brackets 56 and 57 (Fig. 12) by means of keys and washers 58 and 59 on the outer sides of these brackets and spacing sleeves 61 and 62 disposed between the outermost hub portions of the series and the adjacent one of brackets 56 and 57. Each of these brackets may be provided with laterally spaced webs or flanges 63, 64, 66 and 67 (Fig. 7) in which are mounted axles 68 carrying wheels 69 adapted to ride on rails 71. It will be seen that these movable end brackets and the shaft 53 mounted thereon constitute a movable carriage for supporting the members 51 for movement relative to the contacts 28—32 (Fig. 5). For further bracing this carriage a bar 72 (Fig. 1) may be attached to the end brackets adjacent the ends of the axles on one side thereof and on the opposite side in a similar position a rack 73 may be attached to the end brackets 56 and 57. A vertically disposed plate 74 (Figs. 11 and 12) extends longitudinally beneath shaft 53 and is secured to end brackets 56 and 57 as by means of laterally extending flanges 76 and 77 and suitable attaching elements (not shown). This plate may be provided with vertically disposed slots 78 spaced to receive gears 52 for assisting in spacing the latter. In order to assure that the carriage will not leave the rails 71 a horizontal rod 79 (Fig. 12) may be secured in fixed brackets 81 (Fig. 12) and 82 (Fig. 6) and arranged to extend through openings 83 and 84 in the upper portions of movable brackets 56 and 57. Preferably openings 83 and 84 are of a size to have a free running fit with rod 79. The carriage supporting rails 71 may also be secured to fixed brackets 81 and 82 and otherwise attached to the framework, as by being secured to the base 86 of the cabinet.

Figure 2:
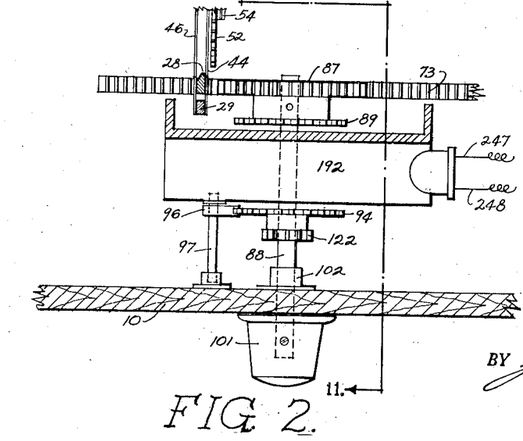

For moving the carriage just described, a pinion 87 fixed on a shaft 88 (Figs. 1, 2 and 9) may be arranged to engage rack 73 attached to the carriage. A gear 89 fixed on shaft 88 meshes with a pinion 91 (Fig. 9) fixed on a shaft 92 which is connected to and operated by time control mechanism 93, such as a clock, "Telechron," or the like. For preventing overrunning of the time control mechanism, a ratchet 94 may be fixed on shaft 88 adjacent the time control mechanism and a double pawl 96 (Fig. 10) may be pivotally mounted on a fixed pivot 97 in the form of a shaft (Fig. 2) mounted on the time control mechanism and on the front panel of the cabinet 10. A retractile spring 98 may be connected to a fixed pin 99 and to the longer arm of the pawl, as shown, so that this pawl and its cooperating ratchet may operate in the well known manner to provide for advance of the carriage with a definite step by step motion. For manually adjusting the position of the carriage, shaft 88 may be arranged to extend through the front panel of cabinet 10 and be equipped with a manually operable knob 101. A bearing 102 may be mounted on the inner wall of this panel for rotatably supporting this shaft.

In order that the position of the carriage may be known at any time to the operator or user, a dial 103 (Figs. 6 and 10) may be rotatably mounted in the front wall of cabinet 10, as by being disposed in an annular recess in the rear surface of said wall and held therein by an overlying retaining ring 104 secured to this wall in any suitable manner, as by attaching elements 106. This dial may be graduated to indicate the time of day over a given period, as in 15 minute intervals over a 24 hour period. An observation opening 107 may be provided in the cabinet wall opposite this dial, and preferably opposite the upper median portion thereof as shown. For adjusting this dial to make such time corrections as may be desirable, a gear 108 may be affixed to the rear face thereof, as by attaching elements 109, and arranged to mesh with a gear 111 (Fig. 6) fixed on a rotary shaft 112 mounted in a bearing 113, carried by the time control mechanism, and extending through the front panel of cabinet 10 and equipped on its outer end with a manually operable knob 114.

Motion may be transmitted between dial 103 and shaft 88 (Fig. 9) and rack 73 through a friction clutch comprising an element 116 fixed on a rotary shaft 117 having one end affixed to dial 103 and the other end thereof rotatably supported in a bearing 118 mounted on the time control mechanism. The other element 119 of this friction clutch may be affixed to a gear 121 rotatably mounted on shaft 117 and meshing with a pinion 122 affixed to shaft 88. This clutch, comprising cooperating elements 116 and 119, is so constructed and adjusted that when knob 114 is turned to adjust the dial, the elements of the clutch will slip and, hence, gear 121 remains stationary under the resistance to motion imposed thereon by the movable carriage through rack 73, gear 87, shaft 88 and gear 122 meshing with gear 121. However, when knob 101 is turned or time control mechanism 93 operates shaft 88, the latter functions through gears 122 and 121 and elements 119 and 116 of the friction clutch to rotate dial 103 in proportion to movement of the carriage.

During operation of motor 17 (Fig. 6), rotary motion may be transmitted from motor operated shaft 24 to one of the members 51 attached to a gear 52 (Fig. 11) by means of a gear 126 fixed on shaft 24 (Figs. 6 and 11) and meshing with an idler gear 127 fixed on a rotary shaft 128 and a gear 129 rotatably mounted on a non-rotatable shaft 131. To provide for engagement and disengagement of gear 129 and the selected one of gears 52, shafts 128 and 131 may be mounted for transverse bodily movement toward and from gears 52. This may be accomplished by means of a swinging frame comprising spaced side members 132 and 133 (Figs. 3, 6 and 11) pivotally supported on shaft 24 for pendulous motion about the axis thereof.

Figure 17:
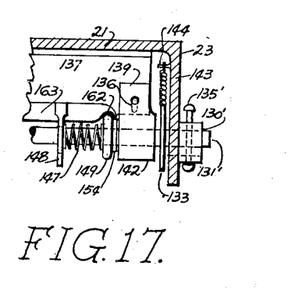
Fig. 17 is a view illustrating a portion of the mechanism shown in Fig. 3, to a larger scale.
Figure 19:
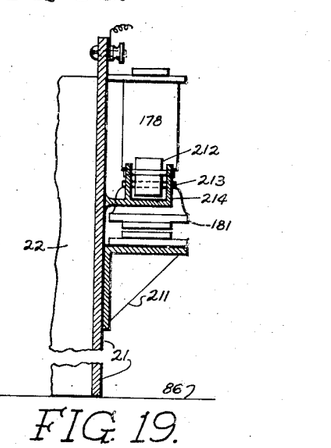
Fig. 19 is a section on line 19—19 of Fig. 13.

Preferably, shaft 128 carrying gear 127 is of such a length (Fig. 14) that it may be entirely disposed within the space between the end walls 22 and 23 of upstanding bracket 21 and rotatably mounted in these swinging side frames 132 and 133, as shown, while shaft 131 is non-rotatably supported on swinging side frames 132 and 133 and has its ends extending through substantially horizontally disposed slots 140 (Fig. 7) in end walls 22 and 23 and projecting outwardly through somewhat elliptical flanges or collars 130 and 130′, fixedly mounted on end walls 22 and 23, respectively. For effectively holding shaft 131 from objectionable endwise movement without interfering with the desired horizontal transverse movement thereof, horizontally disposed, headed pins 135, 135′ may be slidably mounted in collars or flanges 130 and 131′ and fixedly mounted in the end portions of shaft 131, so that as this shaft moves transversely, the heads on these pins serve as abutments which may engage the exterior surfaces of collars 130, 130′ to fix or limit the extent of this movement. This transverse motion may also be limited to a small arc by means of a pair of pin and slot connections 134 and 136 (Figs. 3, 11 and 17) between a laterally extending web 137 carried by upstanding bracket 21, and ears 138 and 139 carried respectively by thimbles 141 and 142. Preferably, pin and slot connections 134 and 136 are loose enough to avoid objectionable binding at these points. A pair of retractile springs 143 (Fig. 3) may be connected between frame members 132 and 133 and fixed pins 144 mounted on upstanding bracket 21. These springs (143) normally urge gear 129 into a position where it is disengaged from a juxtaposed gear 52.

Figures 3, 20:
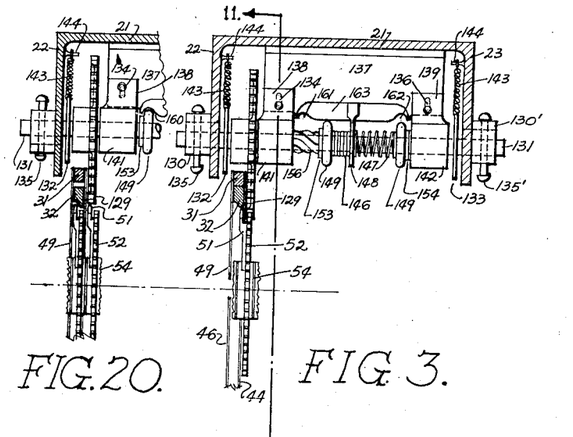
Fig. 20 is an elevational view partly in section illustrating a detail of construction.
Figure 4:
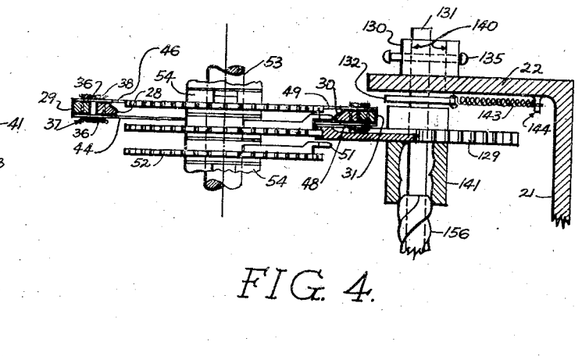
Fig. 4 is a fragmentary plan view to a larger scale illustrating sets of segmental contacts and cooperating means for effecting engagement and disengagement thereof.
Figure 14:
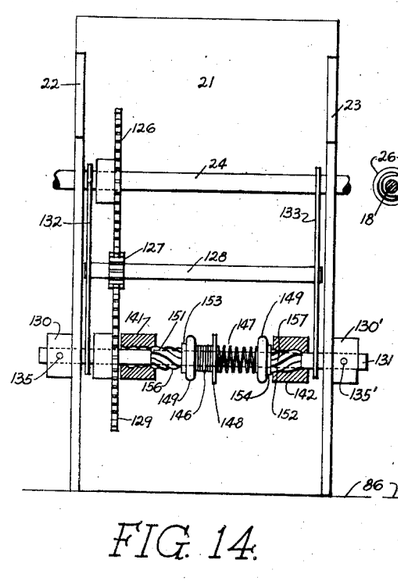
Fig. 14 is a front elevational view of the bracket shown in Fig. 13 and mechanism supported thereby, parts being omitted and broken away for purposes of illustration.

Gear 129 may be moved into engagement with an aligned gear 52 as the motor starts and disengaged therefrom as the motor stops by means of the mechanism shown in Figs. 3 and 14. This mechanism comprises expansible springs 146 and 147 disposed about shaft 131 and seating at their inner ends against a vertically disposed plate 148 fixedly mounted on web 137 on upstanding bracket 21. At their outer ends these springs seat against rollers 149 which are freely rotatable on shaft 131. Sleeves 151 and 152 mounted on shaft 131 for travel longitudinally therealong are provided respectively with flanges 153 and 154 which bear against the adjacent sides of rollers 149 and have frictional, sliding engagement therewith. These sleeves have oppositely disposed, exterior helical threads 156 and 157, respectively, which engage complementary interior threads 158 and 159, respectively, in stationary thimbles 141 and 142. Adjacent rollers 149, web 137 is formed with a cam surface comprising recesses or depressions 161 and 162 and a rise 163.

When the motor is not operating both of the rollers 149 are disposed in the end depressions of this cam surface, but when the motor operates gear 129 in either direction, one of the sleeves (151 or 152) is forced out of its thimble and causes the roller 149 associated therewith to ride up on the rise 163 and thus imparts bodily movement to shaft 131 and gear 129, causing the latter to swing into its position for engagement with one of gears 52. When the motor stops, that one of the springs 146 and 147, which was compressed by the action just described, returns its associated roller to its depression in the cam surface and springs 143 retract, moving side frame members 132 and 133 away from gears 52 and, hence, gear 129 is disengaged from one of gears 52. Gear 129 is never intended to make more than part of a complete revolution.

Figure 15:
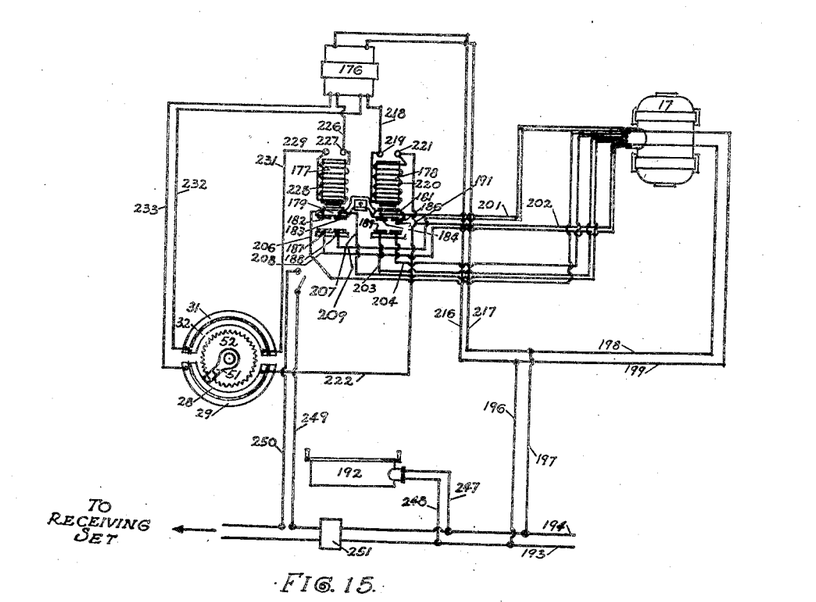
Fig. 15 is a wiring diagram of the circuits and devices for operating this automatic station tuning apparatus.

In accordance with this invention, electrical circuits and apparatus may be provided as shown in Fig. 15. As illustrated, this equipment comprises the reversible motor 17, a voltage reducing transformer 176, electromagnets 177, 178, their associated armatures 179, 181 carrying contacts 182, 183, 184 and 186 for engagement with stationary contacts 187, 188, 189 and 191; the cooperating segmental contacts 28, 29, 31 and 32, a gear 52 and a member 51 associated therewith and with said segmental contacts; and also an electrically operated time control device 192, such as a "Telechron." Electrical energy may be supplied to these devices from lines 193 and 194 connected to any suitable source, preferably to the same source which supplies electrical energy to the receiving set so as to be controlled by the same switch which turns the receiving set on and off. These lines may be connected directly to the time control device 192 by connections 247 and 248.

Electrical energy may be supplied to the motor from lines 193 and 194 through connections 196 and 197 to connections 198 and 199. From the motor, connections 201 and 202 lead to contacts 184 and 186 of armature 181 and connections 203 and 204 lead to contacts 189 and 191. When the circuit is completed from connection 201 through contacts 184 and 189 to connection 203, and from connection 202 through contacts 186 and 191 to connection 204, the motor will operate in one direction. When this circuit is open at these contacts a circuit is completed from the motor through connections 206, 207, contacts 182, 183, 187 and 188 to connections 208 and 209, the motor will operate in the reverse direction.

Figure 13:
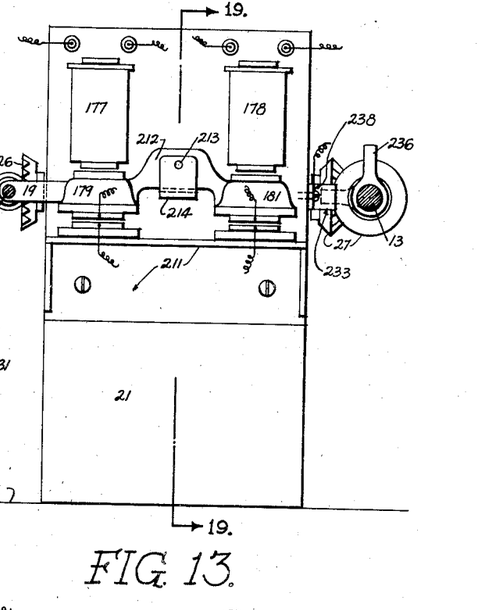
Fig. 13 is a rear elevational view of an upstanding bracket shown in Fig. 6, illustrating the mounting of a pair of electromagnets and cooperating mechanism.

The lower stationary contacts 187, 188, 189 and 191 may be supported on a bracket 211 (Figs. 7 and 13) mounted on the rear wall of upstanding bracket 21. The armatures 179 and 181 may be mounted on the arms of a yoke 212 mounted on a pivot 213 carried by a bracket 214 affixed to the rear of upstanding bracket 21 (Fig. 13). The electromagnets 177 and 178 may also be attached to the rear of upstanding bracket 21 in any suitable manner (not shown).

Electrical energy for operating electromagnets 177 and 178 may be supplied from lines 193 and 194 through connections 196, 197, 198, 199, 216 and 217 to the primary (not shown) of transformer 176. From the secondary (not shown) of this transformer a circuit leads through connection 218 to terminal 219 of electromagnet 178, through winding 220 of the latter to terminal 221 thereof, thence through connection 222 to inner segmental contact 28, to outer segmental contact 29 and through connection 223 back to the secondary of the transformer. Another circuit leads from the secondary of the transformer through connection 226 to terminal 227 of electromagnet 177, through winding 228 thereof to terminal 229, through connection 231 to inner segmental contact 30, outer segmental contact 32 and connection 232 back to the secondary of the transformer. It will be seen that when the circuit is completed through segmental contacts 28 and 29, electromagnet 178 will be energized, and when a circuit is completed through segmental contacts 31 and 32, electromagnet 177 will be energized.

Figures 6, 8:
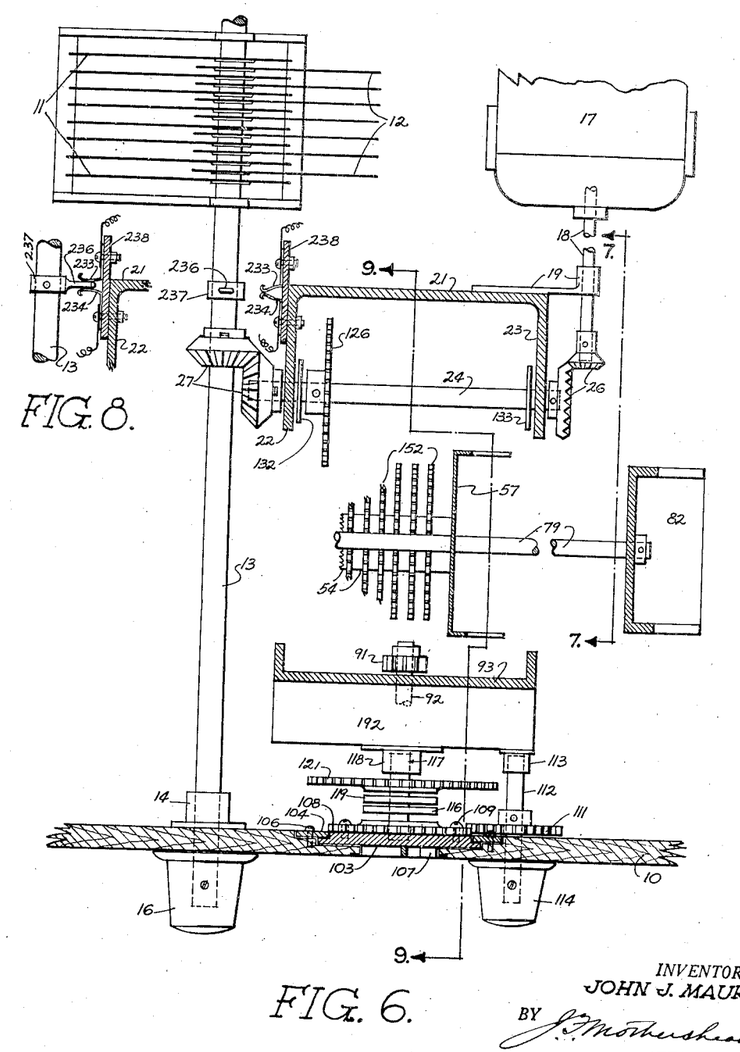
Fig. 6 is a plan view, with parts omitted and broken away for purposes of illustration, of mechanism forming the upper portion of the automatic station tuning apparatus described herein.
Fig. 8 is a fragmentary plan view illustrating a detail of construction.
Figure 7:
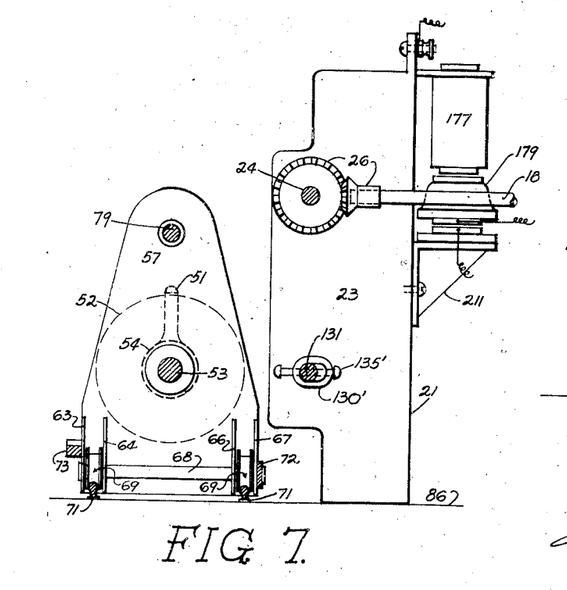
Fig. 7 is a view taken on the line 7—7 of Fig. 6.

In order that the receiving set may be shut off when desired, as when the tuning means are in neutral or off position, a normally closed switch may be connected in line 194 by leads 249 and 250 (Fig. 15). Preferably, a suitable voltage regulator 251 is inserted in lines 193 and 194 ahead of this switch so that these lines may supply electrical energy to the receiving set. This switch (Figs. 6, 8 and 15) may comprise resilient arms 233 and 234 of conducting material normally engaging each other and adapted to be separated to open the circuit by means of an arm 236 of non-conducting material. As shown in Figs. 6 and 8, arm 236 may be carried by a collar 237 on shaft 13, and arms 233 and 234 may be mounted on a strip of non-conducting material 238 secured to any convenient fixed support, as to upstanding bracket 21. This switch may be mounted in such a position that during the normal range of rotary movement of shaft 13 for all tuning adjustments of the receiving set, arm 236 does not engage and separate arms 233 and 234, and only when shaft 13 is turned beyond the range of movement which is useful for tuning is it possible for arm 236 to engage and separate arms 233 and 234. As illustrated, this is accomplished by mounting arms 233 and 234 well below the horizontal transverse center line of shaft 13. It will also be understood that a switch of the usual snap action type may be used in place of the one just described, if desired.

Figure 11:
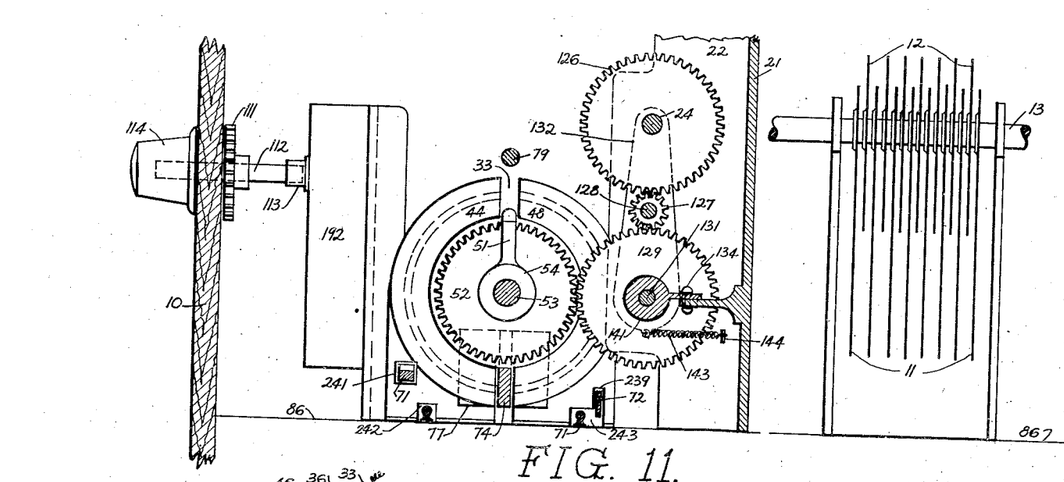
Fig. 11 is a combined section taken on the line 11—11 of Figs. 1, 2 and 3.
Figure 12:
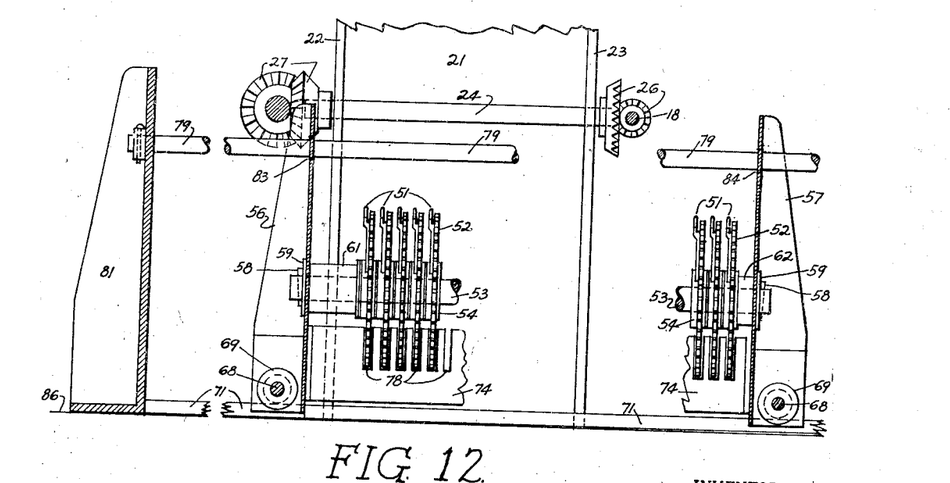
Fig. 12 is a side elevational view taken substantially along the line of 12—12 of Fig. 1, parts being omitted and broken away for purposes of illustration.

In use, this apparatus may be set to tune in selected stations over a given period, as for each 15-minute interval for a 24-hour day by first rotating knob 101 to move the carriage to its extreme right hand position as viewed in Fig. 12, in which position segmental contacts 28—32 are disposed about the left hand spacing sleeve 61. In this arrangement, bracing strip or bar 72 (Fig. 1) of the carriage passes freely through a vertical slot 239 (Fig. 11) in standard 41 which supports outer segmental contact 31 (Fig. 5) and rack 73 passes freely through an opening 241 in standard 39 which supports outer segmental contact 39, while the carriage supporting rails 71 extend freely through slots 242 and 243 in the base portions of standards 39 and 41, respectively, and the vertically disposed and slotted spacing strip 74 for gears 52 extends freely through lower gap 244 between segmental contacts 28—32 (Figs. 5, 11 and 12). The carriage is then returned, by adjusting knob 101 in the opposite direction until the first of the series of gears 52 thereon is disposed in position for engagement with gear 129. As this position is reached the member 51 associated with this gear 52 will either enter the upper gap 33 (Fig. 5) between segmental contacts 28—32 or engage one of the inner segmental contacts 28 or 32 and force it into engagement with its associated outer segmental contact 29 or 31 to complete an electrical circuit through one pair of these contacts, as through contacts 28 and 29 or through contacts 31 and 32. However, as these adjustments are being made the main switch (not shown) for the automatic tuning apparatus should be opened so that no electrical energy is supplied to this electrical equipment.

It will be recalled that as knob 101 is adjusted to move the carriage by means of shaft 88, gear 87 and rack 73 (Fig. 9), gear 122 on shaft 88 also engages gear 121 which acts through elements 119, 116 of the friction clutch to rotate shaft 117 and dial 103 to a position in which the latter will expose through observation opening 107 (Figs. 6 and 10) the time at which the first 15-minute interval is to begin. By adjusting knob 16 (Fig. 6) the tuning means may then be set to tune in the station desired for the first 15-minute interval of the 24-hour day, or if no station is desired the tuning means may be adjusted to neutral or off position which corresponds to a vertical position of member 51 in which the latter is aligned with gap 33 (Fig. 5) for passing freely therethrough without completing a circuit through either of the pairs 28, 29 or 31, 32 of segmental contacts.

If a station is desired for this first interval the tuning means should also be adjusted first to its neutral or off position in which the first of the members 51 register with gap 33. As this adjustment is made the reading of dial 103 should also be checked to ascertain whether it reads correctly, and if it does not, it should be properly adjusted by turning knob 114 which acts through gears 111 and 108 (Fig. 6) to effect this result without disturbing the position of the carriage due to slippage of elements 116 and 119 of the friction clutch (Figs. 6 and 9), as previously described herein.

Figure 16:
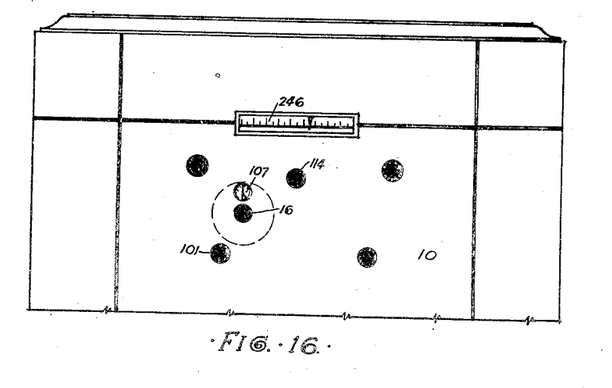
Fig. 16 is a front elevational view of the upper portion of the cabinet of the radio receiving set.

As knob 16 is turned to adjust the tuning means through shaft 13, the latter operates through mitre gearing 27 (Fig. 6) to rotate shaft 24 and gear 126 which, through idler 127 (Fig. 11) rotates gear 129. As gear 129 rotates, one or the other of rollers 149 (Fig. 3) is forced onto the cam rise 163 by the travel of one of the sleeves 151, 152 produced by engagement of its external threads 156 or 157 with complementary internal threads in its associated stationary thimble 141 or 142, which, of course, compresses one of the springs 146 or 147. As one of the rollers 149 rides out onto cam rise 163, shafts 128 and 131 carried by the swinging side frames 132 and 133 and gears 127 and 129 mounted on these shafts swing outwardly to bring gear 129 into engagement with the juxtaposed gear 52. The proper adjustment of the tuning means by knob 16 may be observed on the usual dial provided for this purpose on receiving sets, such as dial 246 (Fig. 16). This adjustment may be in either direction and accordingly it may move gear 52 and its associated member 51 clockwise or counterclockwise from gap 33, thereby causing this member 51 to engage and travel over one of inner segmental contacts 28 or 32 for a distance corresponding to the adjustment of the tuning means for the selected station. This forces the inner contact (28 or 32) into engagement with its associated outer contact (29 or 31) during the adjustment.

Figure 9:
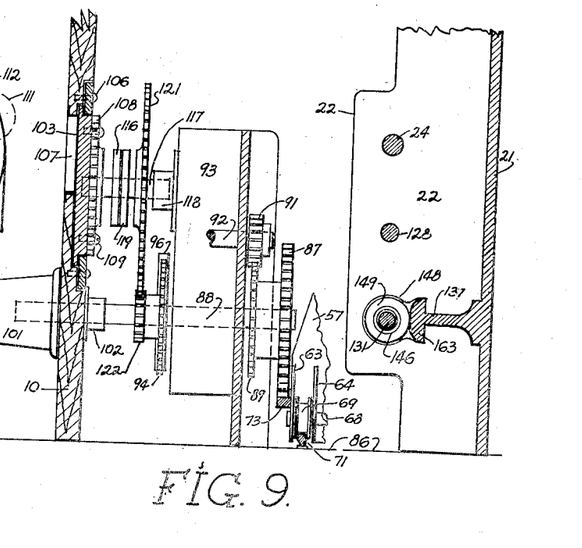
Fig. 9 is a section taken on the line 9—9 of Fig. 6.
Figure 10:
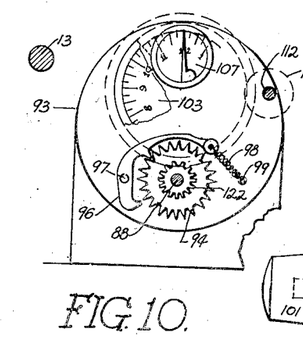
Fig. 10 is a fragmentary elevational view showing an anchor escapement and a face dial set within the front panel of the radio set.

As the adjustment for the first 15 minute interval is completed in this manner, knob 101 (Fig. 9) is turned to advance the carriage to bring the next of gears 52 into position for engagement with gear 129 and the operations just described are repeated for the second of gears 52, and so on until each of the remaining gears 52 and its associated member 51 have been set for their corresponding 15 minute interval of the 24 hour day. The carriage may then be returned to its extreme right-hand position as shown in Fig. 12, by turning knob 101 (Fig. 9). When this is done the receiving set is ready for operation with automatic tuning.

To put the set in operation, the main switch (not shown) is closed, thus supplying electrical energy to lines 193 and 194 and to the circuits and devices shown in Fig. 15. Intermittently, at the beginning of each 15 minute interval, the time control device 192 acts through gears 91 and 89, shaft 88, gear 87 and rack 73 to advance the carriage to bring the next in order of the gears 52 into position for engagement with gear 129. As this is done, the previously set member 51 associated with this gear engages and forces one of the inner segmental contacts 28 or 32 into engagement with its associated outer contact 29 or 31, thereby completing a circuit from the secondary of transformer 176 through the winding of one of the electromagnets 178 or 177.

If electromagnet 177 is energized, for example, it will attract its armature 179 and through the action of yoke 212, this motion will swing downwardly armature 181 of eletromagnet 178 until contacts 184 and 186 engage contacts 189 and 191, thereby completing a circuit from motor 17 through connections 201, 202, 203 and 204 back to the motor and causing it to operate in one direction. As the motor operates it rotates shaft 24 (Fig. 6) and gears 126, 127 and 129 (Fig. 11). As gear 129 starts to rotate it is swung into engagement with the gear 52 previously positioned for engagement with it by adjustment of the carriage by the time control device. As the motor continues to operate this gear 52 also rotates and causes its associated member 51 to travel along the inner periphery of that one of inner segmental contacts 28 or 32 which it engages until this member 51 falls into gap 33 (Fig. 5) and allows such inner segmental contact to be separated from its cooperating outer segmental contact by the action of expansible springs 36, thereby breaking the circuit and stopping the motor. During this period of operation of the motor, shaft 13 (Fig. 6) is driven continuously from shaft 24 through gearing 27 and the tuning means, such as movable plates 12 are continuously and progressively adjusted. When the motor stops, the adjustment of the tuning means for that particular 15-minute interval is completed. It will be seen, therefore, that the period of operation of the motor and the extent of travel of the particular member 51 determines the extent of the adjustment of the tuning means. It will be understood that when electromagnet 178 is energized by engagement of segmental contacts 28 and 29, a similar action takes place, but the motor operates in the reverse direction to cause a member 51 to travel from a position of adjustment on the opposite side of gap 33 back into this gap.

The invention described herein, if patented, may be manufactured and used by or for the Government for governmental purposes without the payment to me of any royalty thereon.

I claim as my invention and desire to secure by my patent:

1. Apparatus of the class described, comprising a reversible motor for adjusting the tuning means of a radio set, circuits for operating said motor in both directions, contact segments associated with said circuits for controlling the latter, a plurality of members angularly adjustable relative to each other for initial engagement with different portions of said contact segments, means for holding said members in fixed spaced relation for successive engagement between only one of said members and only one of said contact segments, means for supporting said contact segments and said members for relative movement for effecting engagement successively between each of said members and one or the other of said contact segments, time control means for periodically effecting said relative movement, and means responsive to operation of said motor for causing one of said members engaging one of said contact segments to travel from the point of initial engagement therewith substantially to the end thereof and thereby determine the extent of adjustment of said tuning means.

2. Apparatus of the class described, comprising a reversible motor for adjusting the tuning means of a radio set, circuits for operating said motor in both directions, contact segments associated with said circuits for controlling the latter, a plurality of members angularly adjustable relative to each other for initial engagement with different portions of said contact segments, means for holding said members in fixed spaced relation for successive engagement between only one of said members and only one of said contact segments, means for supporting said contact segments and said members for relative movement for effecting engagement successively between each of said members and one or the other of said contact segments, time control means for periodically effecting said relative movement, disengageable gearing for transmitting rotary motion from said motor to each of said members while it engages one of said contact segments, and means responsive to operation of said motor for effecting engagement of said gearing and thereby causing one of said members engaging one of said contact segments to travel from the point of initial engagement therewith substantially to the end thereof and thereby determine the extent of adjustment of said tuning means.

3. Apparatus of the class described, comprising a reversible motor for adjusting the tuning means of a radio set, circuits for operating said motor in both directions, contact segments associated with said circuits for controlling the latter, said contact segments being arranged in opposed spaced relation to provide a gap therebetween, a plurality of members angularly adjustable relative to each other for initial engagement with different portions of said contact segments or for passage through said gap when aligned therewith, means for holding said members in fixed spaced relation for successive engagement between only one of said members and only one of said contact segments, means for supporting said contact segments and said members for relative movement for effecting engagement successively between each of said members and one or the other of said contact segments or for passage through said gap, time control means for periodically effecting said relative movement, and means responsive to operation of said motor for causing one of said members engaging one of said contact segments to travel from the point of initial engagement therewith substantially to the end thereof and thereby determine the extent of adjustment of said tuning means.

4. Apparatus of the class described, comprising a reversible motor for adjusting the tuning means of a radio set, circuits for operating said motor in both directions, contact segments associated with said circuits for controlling the latter, a plurality of members angularly adjustable relative to each other for initial engagement with different portions of said contact segments, means for holding said members in fixed spaced relation for successive engagement between only one of said members and only one of said contact segments, a carriage for supporting said members for movement relative to said contact segments for effecting engagement successively between each of said members and one or the other of said contact segments, rails for supporting said carriage for such movement, means for holding said carriage on said rails, time control means for periodically effecting said movement, and means responsive to operation of said motor for causing one of said members engaging one of said contact segments to travel from the point of initial engagement therewith substantially to the end thereof and thereby determine the extent of adjustment of said tuning means.

5. Apparatus of the class described, comprising a reversible motor for adjusting the tuning means of a radio set, circuits for operating said motor in both directions, contact segments associated with said circuits for controlling the latter, a plurality of members angularly adjustable relative to each other for initial engagement with different portions of said contact segments, means for holding said members in fixed spaced relation for successive engagement between only one of said members and only one of said contact segments, a carriage for supporting said members for movement relative to said contact segments for effecting engagement successively between each of said members and one or the other of said contact segments, a rack affixed to said carriage, a pinion engaging said rack, time control means for periodically actuating said pinion for effecting said movement, independently operable means for actuating said pinion, and means responsive to operation of said motor for causing one of said members engaging one of said contact segments to travel from the point of initial engagement therewith substantially to the end thereof and thereby determine the extent of adjustment of said tuning means.

6. Apparatus of the class described, comprising a reversible motor for adjusting the tuning means of a radio set, circuits for operating said motor in both directions, contact segments associated with said circuits for controlling the latter, a plurality of members angularly adjustable relative to each other for initial engagement with different portions of said contact segments, means for holding said members in fixed spaced relation for successive engagement between only one of said members and only one of said contact segments, a carriage for supporting said members for movement relative to said contact segments for effecting engagement successively between each of said members and one or the other of said contact segments, time control means for periodically effecting said movement, time indicating means responsive to said movement, and means responsive to operation of said motor for causing one of said members engaging one of said contact segments to travel from the point of initial engagement therewith substantially to the end thereof and thereby determine the extent of adjustment of said tuning means.

7. Apparatus of the class described, comprising a reversible motor for adjusting the tuning means of a radio set, circuits for operating said motor in both directions, contact segments associated with said circuits for controlling the latter, a plurality of members angularly adjustable relative to each other for initial engagement with different portions of said contact segments, means for holding said members in fixed spaced relation for successive engagement between only one of said members and only one of said contact segments, a carriage for supporting said members for movement relative to said contact segments for effecting engagement successively between each of said members and one or the other of said contact segments, time control means for periodically effecting said movement, time indicating means responsive to said movement of said carriage, independently operable means for moving said time indicating means, and means responsive to operation of said motor for causing one of said members engaging one of said contact segments to travel from the point of initial engagement therewith substantially to the end thereof and thereby determine the extent of adjustment of said tuning means.

8. Apparatus of the class described, comprising a reversible motor for adjusting the tuning means of a radio set, normally open circuits for controlling the operation of said motor in either direction, means for completing either of said circuits comprising a plurality of rotary members arranged about a common axis for rotary movement and adjustment relative to each other, substantially arcuate members disposed about said axis and said rotary members for cooperative engagement with the latter, said arcuate members being spaced to provide an intervening neutral or off position, means responsive to engagement of one of said rotary members and one of said arcuate members for completing one of said circuits, means responsive to engagement of one of said rotary members and the other of said arcuate members for completing the other of said circuits, and means responsive to operation of said motor for causing a rotary member engaging one of said arcuate members to return to said intervening neutral or off position at a speed proportional to the speed of said motor and thereby to determine the extent of adjustment of said tuning means.

9. Apparatus of the class described, comprising a reversible motor for adjusting the tuning means of a radio set, normally open circuits for controlling the operation of said motor in either direction, means for completing either of said circuits comprising a plurality of rotary members arranged about a common axis for rotary movement and adjustment relative to each other, substantially arcuate members disposed about said axis and said rotary members for cooperative engagement with the latter, said arcuate members being spaced to provide an intervening neutral or off position, means responsive to engagement of one of said rotary members and one of said arcuate members for completing one of said circuits, means responsive to engagement of one of said rotary members and the other of said arcuate members for completing the other of said circuits, means responsive to operation of said motor for causing a rotary member engaging one of said arcuate members to return to said intervening neutral or off position at a speed proportional to the speed of said motor and thereby to determine the extent of adjustment of said tuning means, and time control means for periodically effecting relative movement between said rotary members and said arcuate members for successively establishing a cooperative relationship between said arcuate members and each of said rotary members.

10. Apparatus of the class described, comprising a reversible motor for adjusting the tuning means of a radio set, normally open circuits for controlling the operation of said motor in either direction, means for completing either of said circuits comprising a plurality of rotary members arranged about a common axis for rotary movement and adjustment relative to each other, substantially arcuate members disposed about said axis and said rotary members for cooperative engagement with the latter, said arcuate members being spaced to provide an intervening neutral or off position, means responsive to engagement of one of said rotary members and one of said arcuate members for completing one of said circuits, means responsive to engagement of one of said rotary members and the other of said arcuate members for completing the other of said circuits, means responsive to operation of said motor for causing a rotary member engaging one of said arcuate members to return to said intervening neutral or off position at a speed proportional to the speed of said motor and thereby to determine the extent of adjustment of said tuning means, and a manually operable rack and pinion mechanism for effecting relative movement between said rotary members and said arcuate members for successively establishing a cooperative relationship between said arcuate members and each of said rotary members.

11. Apparatus of the class described, comprising a reversible motor for adjusting the tuning means of a radio set, circuits for controlling the operation of said motor in either direction, means for completing either of said circuits comprising a plurality of rotary members arranged about a common axis for rotary movement and adjustment relative to each other, a pair of inner and outer segmental contacts interposed in each of said circuits and oppositely disposed about said axis and said rotary members for cooperative engagement between the latter and the inner contact segments, said pairs of inner and outer segmental contacts being spaced to provide an intervening neutral or off position, each of said pairs of said segmental contacts being effective on engagement of one of said rotary members with the inner contact of said pair for completing the circuit with which said pair is associated, and means responsive to operation of said motor for causing a rotary member engaging one of the inner segmental contacts of said pairs to return to said intervening neutral or off position at a speed proportional to the speed of said motor and thereby to determine the extent of adjustment of said turning means.

12. Apparatus of the class described, comprising a reversible motor for adjusting the tuning means of a radio set, circuits for controlling the direction of operation of said motor, a contact associated with each of said circuits for completing or interrupting the circuit with which it is associated, said contacts being spaced to leave a fixed gap providing a neutral or off position therebetween, a plurality of members each of a size to pass freely through said gap when aligned therewith, a carriage movable relative to said contacts, means for supporting said members on said carriage in fixed spaced relation for successive engagement with only one of said contacts and for relative angular movement for alignment with said gap or for engagement with either of said contacts in different positions relative thereto so that on movement of said carriage each of said members in succession may either pass freely through said gap or engage one or the other of said contacts, means responsive to operation of said motor for causing a member engaging one of said contacts to return to said intervening neutral or off position at a speed proportional to the speed of said motor and thereby to determine the extent of adjustment of said tuning means, and time control means for periodically moving said carriage relative to said contacts for effecting successive engagements between said members and said contacts.

JOHN J. MAURO.